United States Patent [19]

Lum et al.

[11] Patent Number: 5,196,684
[45] Date of Patent: Mar. 23, 1993

[54] METHOD AND APPARATUS FOR IMPROVING THE THROUGHPUT OF A CCD BAR CODE SCANNER/DECODER

[75] Inventors: Jackson Lum, Roslyn; Gerard J. Knight, Nesconset; Xin Zheng, Island Park; Wenyu Han, Flushing, all of N.Y.

[73] Assignee: Opticon, Inc., Orangeburg, N.Y.

[21] Appl. No.: 674,709

[22] Filed: Mar. 25, 1991

[51] Int. Cl.[5] .............................. G06K 7/10
[52] U.S. Cl. ................... 235/462; 235/466; 235/472
[58] Field of Search ............ 235/462, 463, 466, 470, 235/472

[56] References Cited

U.S. PATENT DOCUMENTS

| | | | |
|---|---|---|---|
| 4,761,544 | 8/1988 | Poland | 235/466 |
| 4,782,220 | 11/1988 | Shuren | 235/466 |
| 4,845,349 | 7/1989 | Shuren | 235/462 |
| 4,894,522 | 1/1990 | Elliot | 235/462 |
| 4,902,883 | 2/1990 | Poland | 235/462 |
| 4,963,756 | 10/1990 | Quan et al. | |

FOREIGN PATENT DOCUMENTS 0129778  5/1990  Japan ........................... 235/462

Primary Examiner—Eugene R. LaRoche
Assistant Examiner—Tan Nguyen
Attorney, Agent, or Firm—Henry I. Schanzer

[57] ABSTRACT

A method for scanning and decoding the symbols of a bar code label using a CCD image sensor viewing the bar code, and coupled to a signal processor and memory, wherein initially a start of scan (SOS) first level signal is sent from the processor to the CCD image sensor, a digital data signal representative of the bar code is read from the CCD sensor, and the representative data signal read from the CCD sensor is stored in memory. When the SOS signal is at a second signal level, the stored data is validated and decoded to determine if the representative data is valid or invalid. The SOS first level signal is immediately restarted in response to an invalid bar code data signal to recollect bar code data signals from the CCD sensor viewing the bar code so that the scanning steps are repeated, or the SOS first level signal is immediately restarted to re-scan the bar code symbols immediately after the data signal is found valid. Thus, the CCD data collecting scan rate is maximized.

26 Claims, 9 Drawing Sheets

METHOD AND APPARATUS FOR IMPROVING THE THROUGHPUT OF A CCD BAR CODE SCANNER/DECODER

BACKGROUND OF THE INVENTION

1. Field of the Invention

This invention relates to a method and apparatus for improving the throughput of a CCD bar code scanner/decoder. Previous methods of scanning/decoding have employed a fixed decoding time. The invention utilizes adaptive logic to terminate the decode process and enter scanning as soon as the data is determined to be invalid.

2. Description of the Prior Art

There are several types of bar code readers, including, those which scan the bar code using a laser beam and receive the reflected light of the laser beam to determine bar code reading, and CCD units which capture bar code image through a lens system. The bar code scanning devices using the laser beam require a vibrating or rotating motor to drive a prism or laser beam in a scanning mode and are affected by bright, ambient light or sometimes directed light sources, so that no reading will be possible if sunlight falls on the bar code. On the other hand, the CCD bar code scanners rely upon the enhanced ambient light for their readings and do not require mechanical mechanisms to sweep any beam, nor do they require the use of a laser beam at all to read the bar code. The CCD scanners merely focus the bar code onto a photosensitive strip and the data is processed electronically.

In conventional bar code-type readers, a portion of the time of each scan is used for collecting the bar code data, and another part of the time is used for decoding the collected data. In the present invention, however, the decoding/collecting scan rate has been increased to greatly speed up the response of the bar code reader.

In conventional CCD readers, a signal referred to as SOS (start of scan) is used to distinguish data collection from data decoding. On one logic level of the SOS signal, the data collection occurs. During this period, data is serially shifted out of the CCD sensor. In addition, the microcontroller records the time duration between the transitions of bar code data from black to white, and vice versa. On the other SOS signal level, the microcontroller decodes (analyzes) the recorded data. In the fixed method, the microcontroller has to wait for the SOS signal to change level, no matter how quickly it determines the data's validity. This invention allows the SOS signal to change level under the microcontroller control. This saves time that would have otherwise been wasted waiting for the SOS signal to change. Furthermore, the ability to restart the SOS signal allows for an additional time savings. The fixed version of the prior art has to wait, in the worst case, one full cycle of SOS signals before data collection can begin. However, the inventive version can simply restart the SOS signal and begin collecting data.

SUMMARY OF THE INVENTION

It is, therefore, an object according to the present invention to provide a CCD bar code scanner and decoder that increases the scan rate for decoding and collecting the bar code data in order to greatly speed up the bar code reading.

It is another object according to the present invention to provide a bar code reader which is simple in design, easy to manufacture, and reliable in operation.

Other objects and features of the present invention will become apparent from the following detailed description, considered in connection with the accompanying drawings which disclose the embodiments of the invention. It is to be understood, however, that the drawings are designed for the purpose of illustration only, and not as a definition of the limits of the invention.

BRIEF DESCRIPTION OF THE DRAWINGS

In the drawings, wherein similar reference characters denote similar elements throughout the several views.

DETAILED DESCRIPTION OF THE PREFERRED EMBODIMENT

Figure 1:
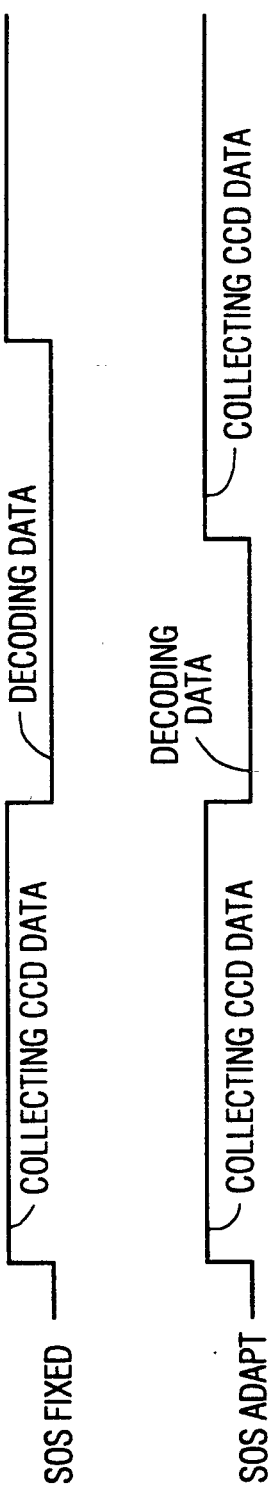
FIG. 1(a) discloses a prior art scan/rate of collecting and decoding the data using timed signals.
FIG. 1(b) discloses the inventive scan rate of collecting and decoding data which increases response of the bar code reader.

Referring in detail to FIG. 1, there is shown a difference in signals between the fixed and adaptive methods as related to the start of the scan (SOS) signal. In FIG. 1(a), where conventional CCD systems use a fixed SOS signal, the CCD data is first collected during approximately half of the scan and then decoded during the second half of the scan before the collection signal restarts. In the present invention, as shown in FIG. 1(b), the start of scan signal (SOS) adapts to the particular bar code which is sensed so that, following the collection of the data, the decoding can be processed quickly, and the collection cycle can restart more quickly, as soon as the bar code's validity has been established. Thus, as soon as the validity or invalidity of the bar code has been established, the collection cycle will immediately commence rather than having to wait for a fixed amount of time to elapse as in the conventional system of FIG. 1(a). The logic or signal level for collecting and decoding data may be reversed so that data collection can occur when SOS is logic "LOW" and data decoding can occur when SOS is logic "HIGH".

Figure 2:
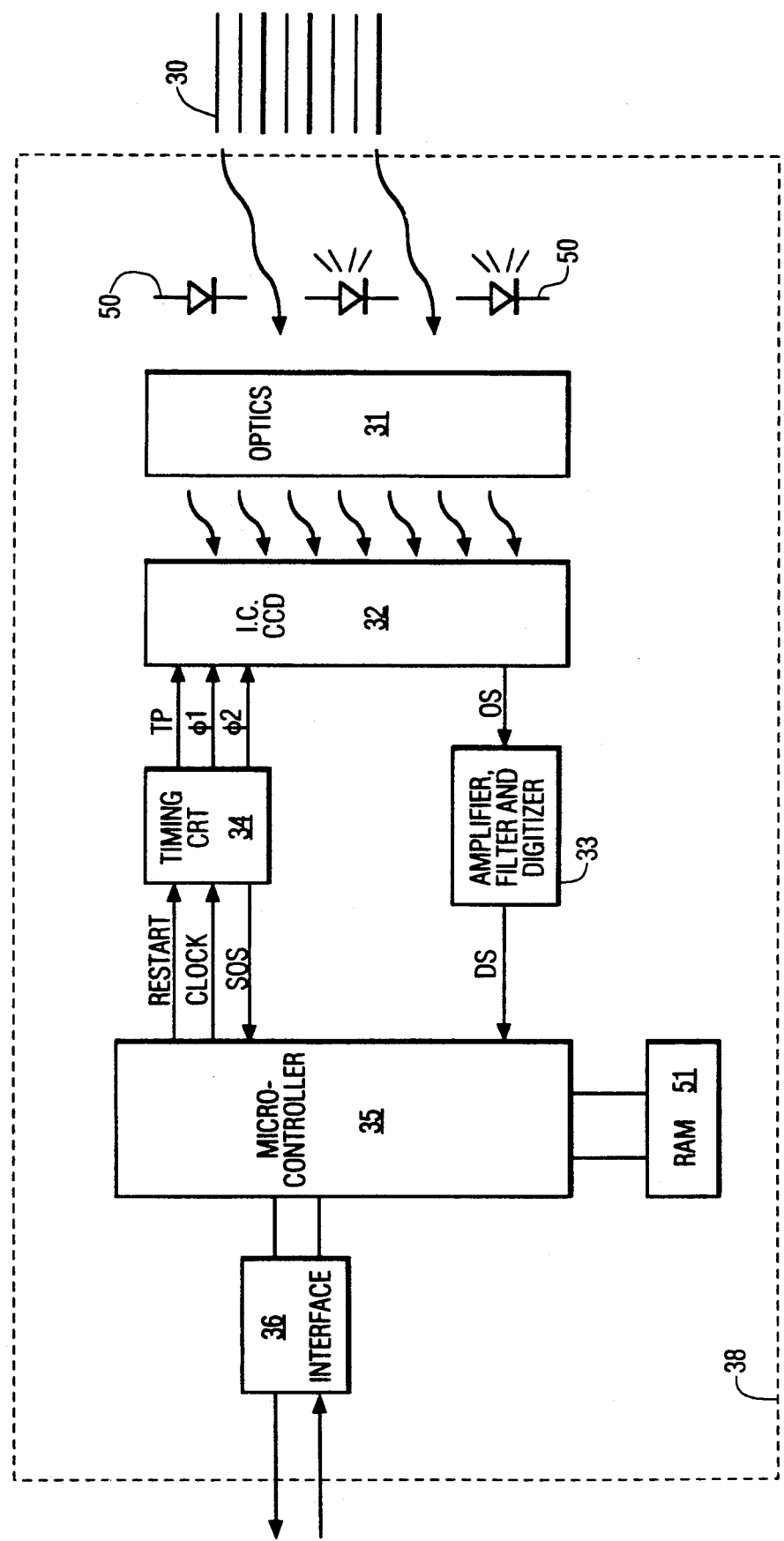
FIG. 2 is an electrical block diagram of the bar code scanner according to the invention.

FIG. 2 shows an electrical block diagram of a CCD hand-held scanner/decoder 38. The scanner is directed at bar codes 30 to be read. These codes are a sequence of highly reflective and lowly reflective printed bars.

Figure 5:
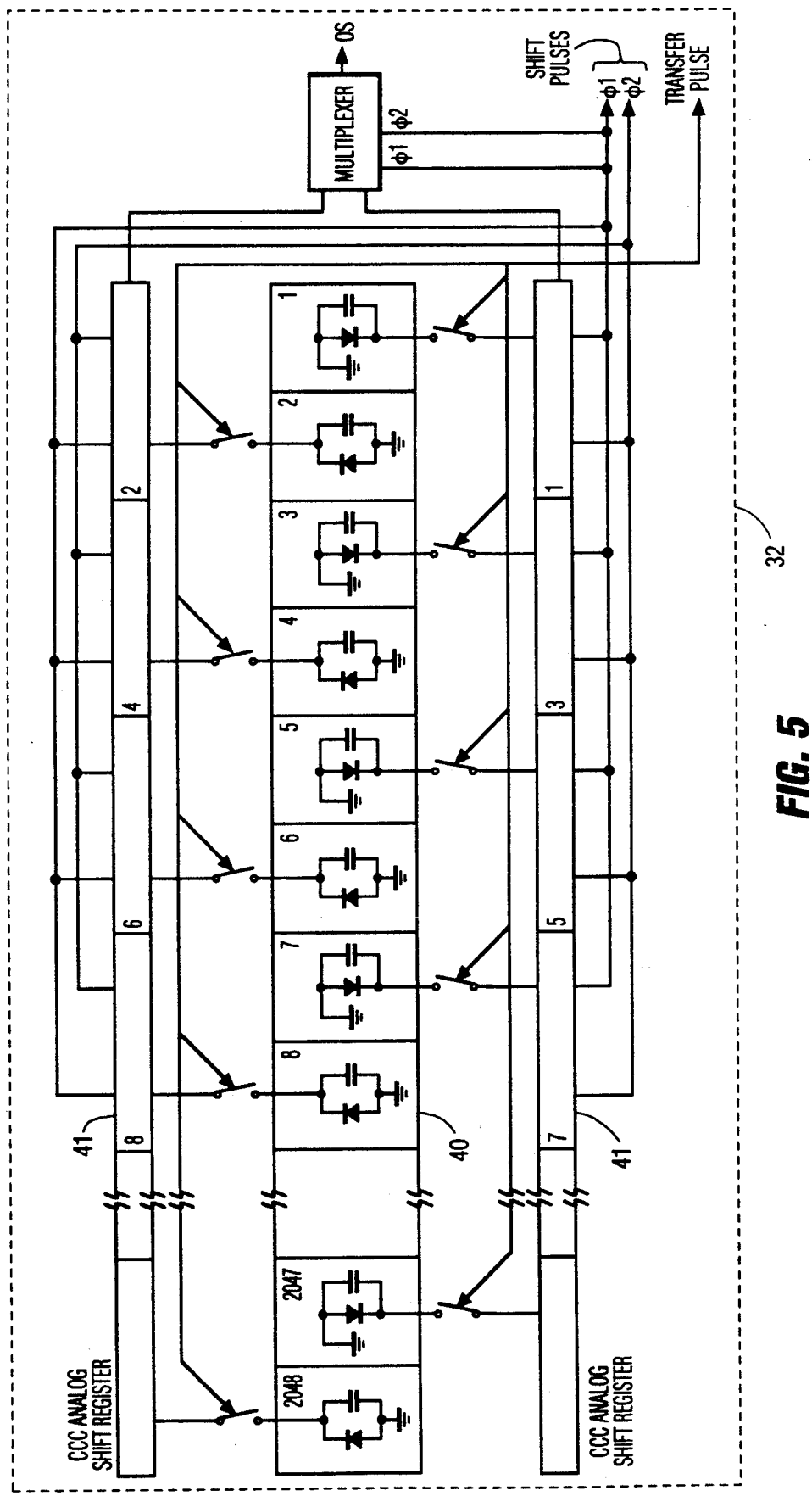
FIG. 5 is an electrical diagram showing the configuration of the CCD linear image sensor having a plurality of pixels for sensing the image of the bar code.
Figure 6:
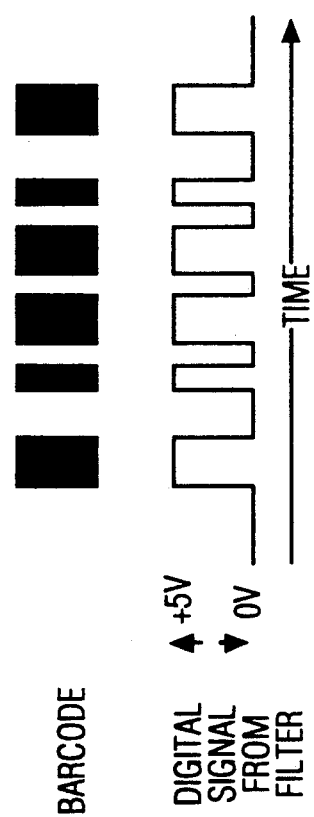
FIG. 6 discloses a digitized signal that is produced by the bar code reader of the invention.

The former are known as spaces while the latter are known as bars. The image of these bars and spaces is projected onto the CCD I.C. 32 by the optics unit 31. Optics unit 31 can be, for example, a lens and mirror combination. In the preferred embodiment, the optics unit 31 can be chosen so that the bar code 30 can be read preferably from 2 to 6 inches from the CCD light sensing area 32. Depending upon the optics, the hand-held unit 38 can be moved closer or farther away from bar code 30 until a bar code comes into focus, at which point a usable image is focused on the CCD light sensing pixels 40 (see FIG. 5). The CCD I.C. 32 has preferably 2048 light sensing pixels 40 arranged in a straight line with a span of about two inches. The width of each pixel 40 is approximately one mil. This means that on the narrowest bar of interest of four mils, there will be four pixels receiving light information from that bar. The light projected onto CCD 32 is integrated over time so that the brighter an object is, the faster the signal will develop, i.e. the faster the charges and voltage of the sensor will increase. After some integration period, the signal on each pixel 40 is transferred to the analog shift registers 41. To accomplish this, the timing circuit 34 (FIG. 2) generates the transfer pulse (TP) signal at the rising edge of the SOS signal. Then, the shift signals $\Phi 1$ and $\Phi 2$ cause the signals generated by the pixels to be shifted towards the output 32 (OS) of the CCD. The output (OS) is fed into the amplifier, filter and digitizer circuit 33. The filter is used to remove any unwanted components of the CCD output. The digitizer 33 is used to transform the signal into a digital signal where a logic high may represent a bar, and a logic low may represent a space. The widths of the digital pulses are proportional to the widths of the printed bars and spaces. The digitized signal, as shown in FIG. 6, is fed into a microcontroller 35. The microcontroller records the time that any transition takes place on this signal and stores the value in its memory 51. Thus, an array of relative widths for all bars and spaces is generated. The microcontroller will record these values until the SOS signal goes "low" or to a second signal level. After this occurs, the data will be analyzed for validity. The validity is determined by the satisfaction of the criteria specified in the symbology specification, such as ANSI standard. If the data represents a valid bar code, it is converted by the microcontroller 35 to ASCII characters and transmitted out of the interface circuit 36. After the transmission or the failure of the validity test, microcontroller 35 restarts SOS timer 34. Another cycle of collecting data then begins.

Figure 3:
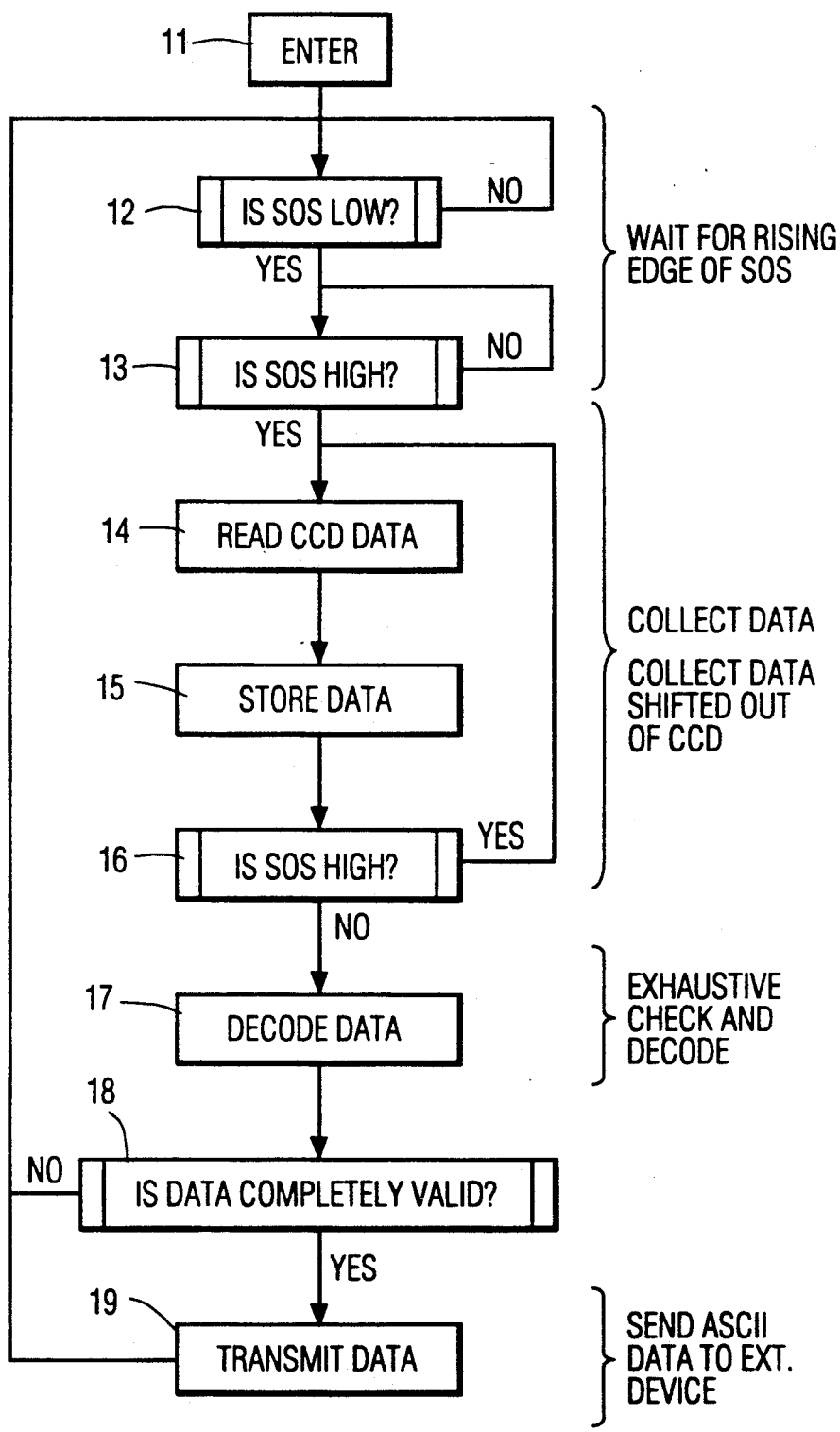
FIG. 3 is a software flow diagram of a nonadaptive prior art system.

Referring to FIG. 3, there is shown a software flow diagram for the conventional fixed scan/decode technique. The enter block 11 can be reached as a result of an operator pressing the start trigger on the CCD unit. The microcontroller will then sample the SOS signal until it observes a positive rising edge 12 and 13. Since the SOS signal is asynchronous with the microcontroller, this could take up to one cycle of time of the SOS signal to be completed. This cycle of time represents a latency period, which is eliminated in the adaptive technique of the invention. Continuing, in the next three blocks 14, 15 and 16, data from the CCD signal is converted into numbers, proportional to the pulse widths, and stored in the microcontroller memory 51 until the SOS signal goes at a second signal level. Next, an attempt to convert these numbers to a string of ASCII character is made in data decode block 17. If the data cannot be converted, flow will be directed back to block 12. Because the time required to reject data can vary widely, the SOS signal is in a random phase when block 12 is entered. There is thus a possibility that the system has to wait or waste a full cycle of the SOS signal. If, in block 17, the data was successfully converted, it would be transmitted to some other piece of equipment, such as a cash register or computer in block 19. At this point, block 12 would be entered. Block 12 would be entered at a random phase, and the last time penalty would have to be paid.

Figure 4:
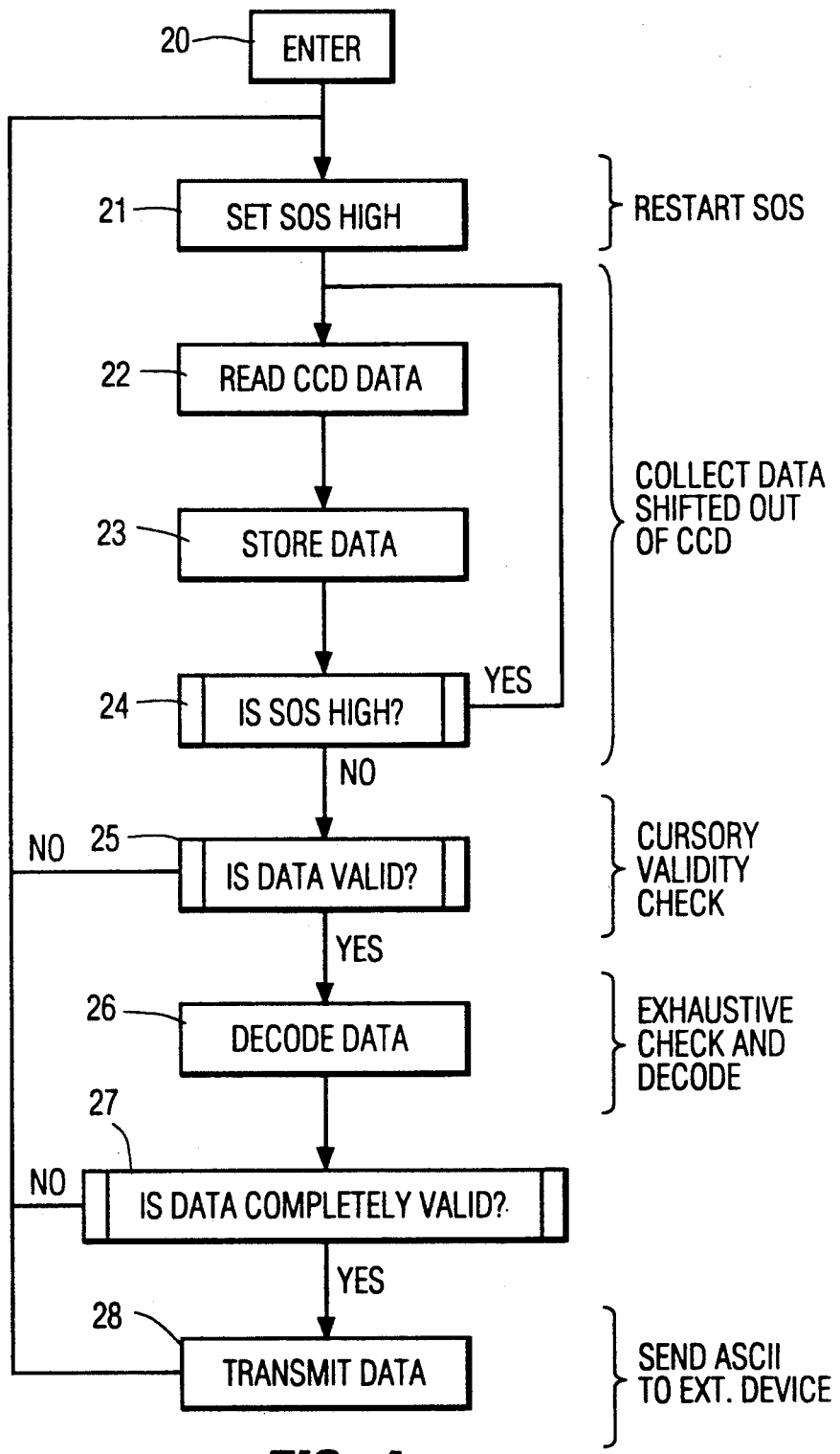
FIG. 4 is a software flow diagram of the adaptive system according to the present invention.

Referring to FIG. 4, there is shown a software flow diagram for the inventive adaptive scan/decode technique. As before, the enter block 20 is reached in response to an operator pressing the start switch. The microcontroller 35 restarts the SOS signal and forces it at a first signal level in block 21. Hence, there is no waiting as in the conventional method of FIG. 3. Next, the data is converted to numbers and stored in memory 51 in blocks 22, 23 and 24 for as long as the SOS signal is at a first signal level. In block 25, the data is cursorily checked for validity. If the data is invalid, block 21 is reentered. Otherwise, a more rigorous validity and decoding is performed in block 26. If the data is then found to be invalid in block 27, block 21 is re-entered. If the data was decoded successfully, it is transmitted to an external device 28. Subsequently, block 21 is re-entered and the process is repeated. The important point is that in no case does microcontroller 35 have to wait for the SOS signal to go to a first signal level. The microcontroller 35 restarts the SOS signal immediately after the data is found invalid in block 25 or 27, or immediately after it is found valid in block 28. Once a valid ASCII string has been generated, it is fed from the output of microcontroller 35 to interface 36, where it can be connected to a computer or read out (not shown).

By shortening the data processing cycle, the present system of the invention is faster at reading and verifying existing bar codes. In the hand-held scanner of the invention, the CCD unit will have the capability of scanning the bar code under most ambient light conditions. However, small light emitting diodes 50 serving as an illumination source can also be mounted on the hand-held scanner and directed at the bar code so that bar codes can be read with no ambient light or under conditions of extreme brightness as well. Since no laser beam or mechanical scanning devices are required, the hand-held unit can be produced at lower cost of many hand-held laser scanning devices presently in use. The hand-held scanner of the present invention is also more reliable in that without a scanning device or laser, it is not subject to breakage when accidentally dropped. Moreover, by not using a scanning laser beam, there is no health hazard to the eyes of the user or persons standing near the scanner.

Figure 7:
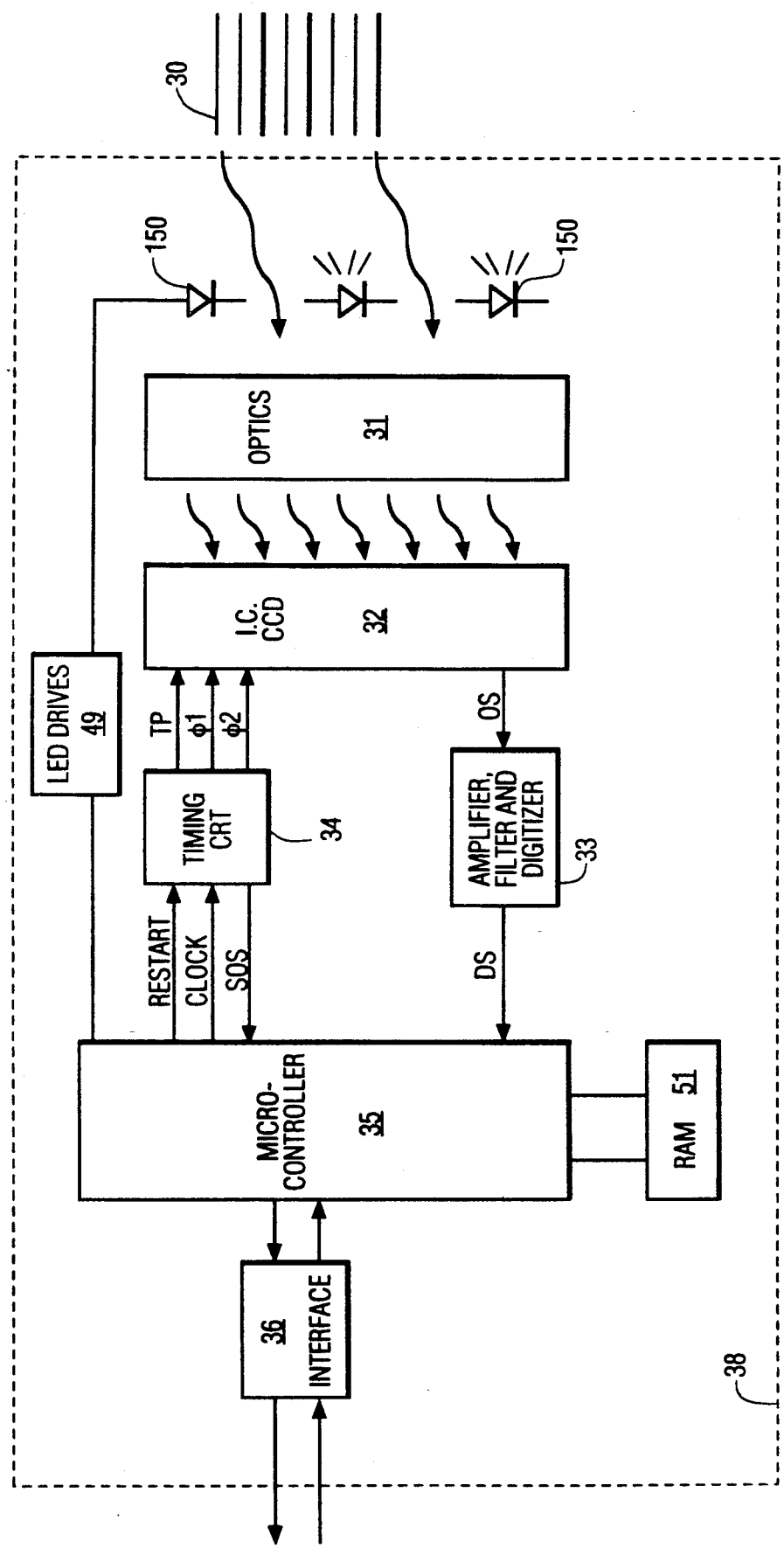
FIG. 7 is an electrical block diagram of another embodiment of the bar code scanner similar to that of FIG. 2, according to the invention.

Referring to FIG. 7, there is shown an electrical block diagram similar to FIG. 2 with the addition of an LED driver 49 coupled to microcontroller 35 for flashing a plurality of LED diodes 150 which are directed to illuminate bar code 30. It is known that if LEDs 150 are pulsed with high current that they will flash with much greater illumination of light onto bar code 30 and actually reduce the "shutter speed" and thus increase the sensitivity of the bar code reader.

Figure 8:
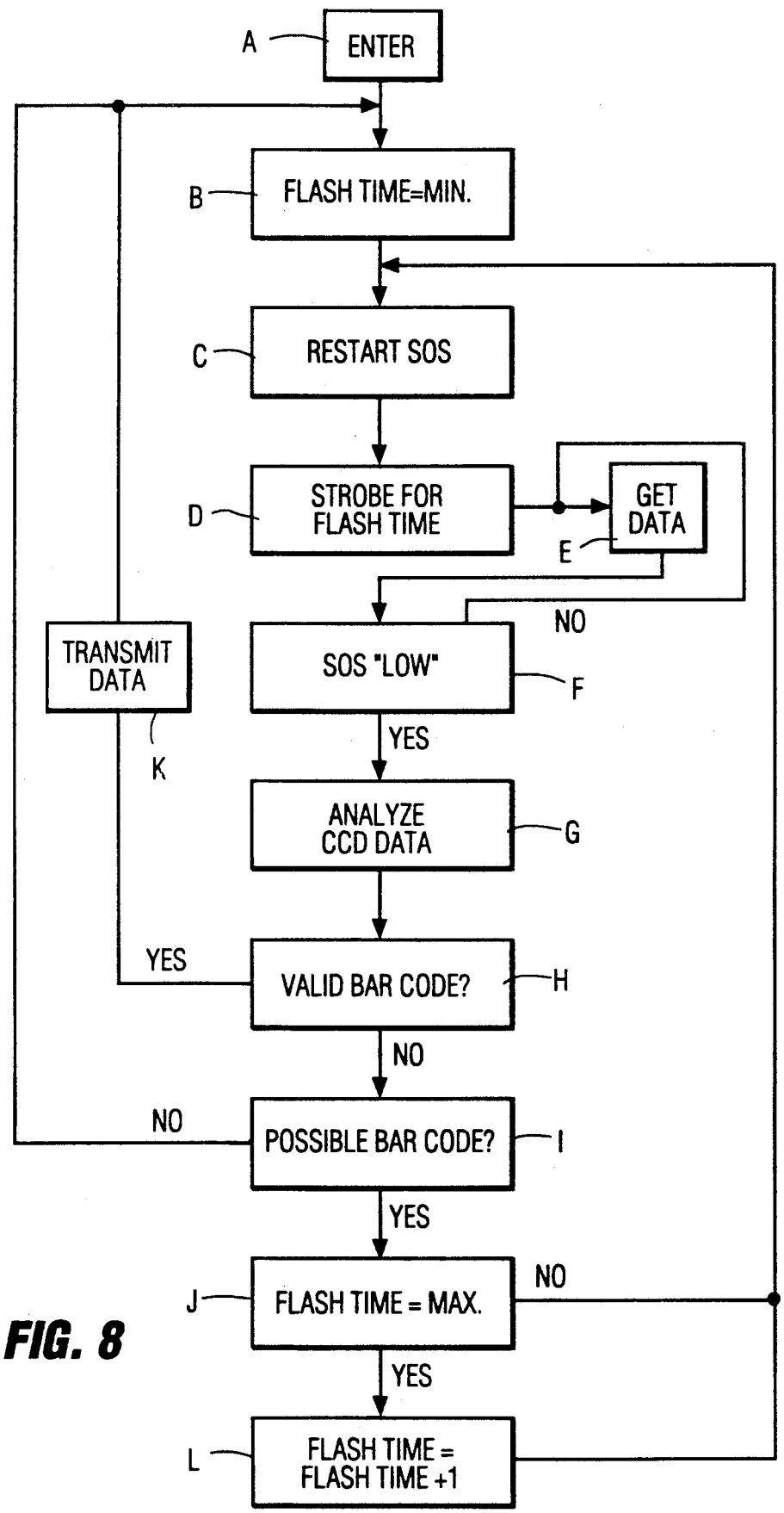
FIG. 8 is a software flow diagram of the additional embodiment disclosed in the block diagram of FIG. 7.
Figure 9:
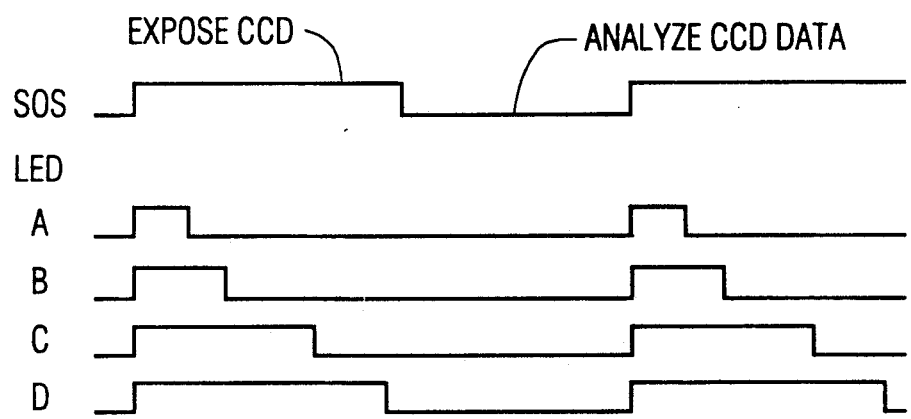
FIG. 9 is a comparison between the inventive scan rate for collecting and decoding data and the flash-time of the LED diodes of the circuit.

FIG. 8 discloses the software flow diagram for the program in microcontroller 35 that is used to flash diodes 150 and FIG. 9 discloses the increase in the flash duration with respect to the SOS signal.

Referring to FIG. 8, there is shown a software flow diagram for the shutter speed optimization system. The enter block A can be reached as a result of an operator pressing the start trigger on the CCD unit. In block B, a variable "FLASH-Time", which is used to set the time duration of the flash is initialized to a minimum value. Next, the SOS is restarted in block C. Immediately following, the strobe light is flashed for a time period determined by the current value of FLASH-Time in block D. The microcontroller will then read data from the CCD and store it in a memory buffer in block E. In block F, the program waits until the SOS signal goes low. The buffer is then analyzed to determine if a valid bar code can be deciphered in block G. A conditional branch is performed in block H. If there is a valid bar code, it is transmitted through the interface hardware to an external piece of equipment such as a cash register or computer in block K. If the test in block H failed (no valid bar code), the data is examined to see if it suggests that a bar code could be present but perhaps was not valid because the exposure was too low. The criteria for this examination is that the buffer contain a minimum number of transitions from bars to spaces. When a scanner is scanning open space, the transitions are less than when approaching a bar code label. If this test (bar code possible), in block I passes, the FLASH-Time is tested for its maximum value in block J. If the FLASH-Time has not reached its maximum value, it is increased by one in block L. If it has reached its maximum value, the FLASH-Time is not changed. The cycle is then repeated by reentering block C. Thus, when a bar code is approached by the scanner, the FLASH-Time of the LEDs is increased, as shown in FIG. 9, until a valid reading is obtained.

In an actual embodiment, sensor 32 was selected as a Toshiba TCD 131D, a CCD linear image sensor having 2048 pixels. Microcontroller 35 was selected to be a Hitachi 6301Y. Interface 36 was selected to be a MAX 232 by Maxim.

The 39 bar code was developed in 1974 to provide a fully alphanumeric bar code for data entry systems. This bar code is especially effective in applications that use alphanumeric data for item identification. The structure of 39 enables it to be printed by a wide variety of techniques, including offset, letterpress, fully-formed impact printers, dot matrix printers, and non-impact printing devices.

Current application areas include inventory control, manufacturing work-in-process, tracking, wholesale distribution, hospitals, government agencies and retail point of sale. 39 is the most widely used alphanumeric bar code. It has been accepted as a standard code by many companies and industries. Specification ANSI Draft MH10.X-1981, entitled, "Specifications for Bar Code Symbols on Transport Packages & Unit Loads," describes three different bar code symbologies. 39 is called 3-of-9 code in the ANSI specification. Moreover, the Department of Defense MIL-STD-1189, dated Jan. 4, 1982, defines 39 (called 3 of 9 code) as the standard symbology for marking unit packs, outer containers, and selected documents.

While only a single embodiment of the present invention has been shown and described, it is obvious that many changes and modifications may be made thereto without departing from the spirit and scope of the invention.

What is claimed is:

1. A method for scanning and decoding the symbols of a bar code label using a CCD image sensor viewing the bar code, and coupled to a signal processor with memory comprising the steps of:
   (a) setting a start of scan signal (SOS) to a first signal level from the processor;
   (b) while the SOS signal is at the first signal level, reading from the CCD sensor a digital data signal representative of the bar code;
   (c) storing in memory the representative data signal read from the CCD sensor;
   (d) validating and decoding the stored data signal when the SOS signal is at a second signal level to determine if the representative data is valid or invalid;
   (e) immediately restarting the SOS first level signal whenever an invalid bar code data signal is decoded to recollect bar code data signals from the CCD sensor viewing the bar code so as to repeat step (a); and
   (f) following step (d), immediately restarting the SOS first level signal so as to repeat step (a) whenever the data signal is found valid, whereby the CCD data collecting scan rate is maximized by minimizing the duration of the SOS second level signal and immediately restarting the scanning of the bar code whenever a bar code has been found to be valid or invalid.

2. The method as recited in claim 1, wherein said step of reading comprises the steps of filtering and digitizing the data signal to produce said representative signal.

3. The method as recited in claim 1, comprising the step of illuminating the bar code using lamp means in response to the SOS signal.

4. The method as recited in claim 3, wherein said lamp means comprises LED lamps.

5. The method as recited in claim 3, additionally comprising the step of examining the stored data signal of step (d) to determine if the image sensor is scanning valid or invalid bar code, successively increasing the flash time to the LED lamps in response to step (e) as the bars and spaces are scanned, resetting the flash time in response to step (f) when a data signal is found valid.

6. The method as recited in claim 5, additionally comprising an LED driver coupling the microcontroller to said LED lamps, said microcontroller increasing the flash time of said LEDs at the start of the SOS signal.

7. The method as recited in claim 1, wherein said CCD image sensor comprises a linear strip of a plurality of light sensitive pixels having an optical resolution greater than any individual bar and space of the bar code label, and a plurality of shift registers coupled to said light sensitive pixels.

8. The method as recited in claim 7, additionally comprising a timing circuit responsive to the output of the microcontroller for restarting the SOS signal, said timing circuit being coupled to the shift registers of said CCD image sensor.

9. The method as recited in claim 8, wherein said timing circuit shifts the collected bar code data from the shift registers of said CCD image sensor to said microcontroller.

10. The method as recited in claim 2, wherein said image sensor comprises lens and mirror means for focusing the bar code labels onto the pixels.

11. An apparatus for scanning and decoding the symbols of a bar code comprising:

a microcontroller having a timing circuit for generating a start of scan (SOS) first level signal and a SOS second level signal;

a CCD image sensor, coupled to said microcontroller and viewing the bar code, for scanning the bar code in response to the SOS signal;

said CCD sensor producing a digital data signal representative of the bar code;

memory means coupled to said image sensor for storing in memory the representative data signal read by said CCD signal, said microcontroller validating and decoding the stored data signal in said memory means when the SOS signal is at the second level to determine if the representative data is valid or invalid, and immediately restarting the SOS first level signal whenever an invalid bar code data signal is decoded to recollect bar code data signals from the CCD sensor viewing the bar code; and said microcontroller immediately restarting the SOS first level signal so as to recollect bar code data signals whenever the data signal is found valid, whereby the CCD data collecting scan rate is maximized by minimizing the duration of the SOS second level signal and immediately restarting the scanning of the bar code whenever a bar code has been found to be valid or invalid.

12. The apparatus as recited in claim 11, additionally comprising a filtering and digitizing means for filtering out noise and unwanted signals from the data signal to produce said representative signal.

13. The apparatus as recited in claim 12, additionally comprising an LED driver circuit coupled to said microcontroller and having its output coupled to said LED lamps and means responsive to said SOS signal and said microcontroller for increasing the flash tie of said LEDs between the time the representative data is invalid and the data signal becomes valid.

14. The apparatus as recited in claim 13, wherein said means for increasing the flash time comprises increasing the current to the LEDs a first increment above its initial value upon reading the first invalid signal, further increasing the current to said LEDs in increments until a valid bar code is read and resetting the current to the LEDs to its initial value.

15. The apparatus as recited in claim 11, comprising lamp means for illuminating the bar code symbols in response to the SOS signal.

16. The apparatus as recited in claim 15, wherein said lamp means comprises LED lamps.

17. The apparatus as recited in claim 16, wherein said LED lamps are disposed around the periphery of said lens and mirror means to illuminate the bar code symbols.

18. The apparatus as recited in claim 11, wherein said CCD image sensor comprises a linear strip of a plurality of light sensitive pixels having an optical resolution greater than any individual bar and space of the bar code label, and means for serially shifting the data collected from said pixels.

19. The apparatus as recited in claim 18, wherein said means for serially shifting the collected data comprises a plurality of shift registers coupled to said pixels.

20. The apparatus as recited in claim 11, wherein said image sensor additionally comprises lens and mirror means for focusing the bar code labels onto the pixels.

21. An apparatus for scanning and decoding the symbols of a bar code comprising:

a microcontroller having a timing circuit for generating a start of scan (SOS) first level signal and a SOS second level signal;

an image sensor, coupled to said microcontroller and viewing the bar code, for scanning the bar code in response to the SOS signal;

said image sensor producing a digital data signal representative of the bar code;

memory means coupled to said image sensor for storing in memory the representative data signal read by said image sensor; and said microcontroller including means validating and decoding the stored data signal in said memory means when the SOS signal is at the second level for determining whether the representative data is valid and for initiating a new SOS first level signal in response to the decoding of either one of an invalid and a valid bar code data signal.

22. The apparatus as recited in claim 21 wherein said image sensor is a charge coupled device (CCD) image sensor.

23. A method for scanning and decoding the symbols of a bar code label using an image sensor viewing the bar code, and coupled to a signal processor with memory comprising the steps of:

(a) setting a start of scan signal (SOS) to a first signal level from the processor;

(b) while the SOS signal is at the first signal level, reading from the image sensor a digital data signal representative of the bar code;

(c) storing in memory the representative data signal read from the image sensor;

(d) validating and decoding the stored data signal when the SOS signal is at a second signal level to determine whether the representative data is valid; and (e) immediately restarting the SOS first level signal whenever an invalid bar code data signal is decoded to re-read bar code data signals from the sensor viewing the bar code so as to repeat step (a).

24. The method of claim 23 further including the step of:

immediately restarting the SOS first level signal so as to repeat step (a) whenever the data signal is found valid, whereby the data collecting scan rate is maximized by minimizing the duration of the SOS second level signal and immediately restarting the scanning of the bar code whenever a bar code has been found to be either one of valid and invalid.

25. The method of claim 24 wherein the image sensor is of the CCD type.

26. An apparatus for scanning and decoding the symbols of a bar code comprising:

a microcontroller having a timing circuit for generating a start of scan (SOS) first level signal and a SOS second level signal;

an image sensor, coupled to said microcontroller and viewing the bar code, for scanning the bar code in response to the SOS signal;

said image sensor producing a digital data signal representative of the bar code;

memory means coupled to said image sensor for storing in memory the representative data signal read by said image sensor; and said microcontroller including means validating and decoding the stored data signal in said memory means when the SOS signal is at the second level for determining whether the representative data is valid and for controlling the duration the SOS signal is at the second level as a function of the validity of the bar code data signal.

* * * * *